July 30, 1963 P. C. ZUMBUSCH 3,099,470
ADJUSTABLE DOWEL
Filed Feb. 8, 1962

PETER C. ZUMBUSCH
INVENTOR.

BY Daniel A. Bobis
atty

United States Patent Office 3,099,470
Patented July 30, 1963

3,099,470
ADJUSTABLE DOWEL
Peter C. Zumbusch, Upper Montclair, N.J., assignor to Worthington Corporation, Harrison, N.J., a corporation of Delaware
Filed Feb. 8, 1962, Ser. No. 171,968
5 Claims. (Cl. 287—127)

This invention relates generally to an adjustable dowel. More particularly the invention relates to an adjustable dowel which can dowel two members regardless of whether the dowel holes are aligned or not.

The use of dowels is well known in the art. However, one of the disadvantages of the prior art was the use of two types of dowels, one if the holes were in alignment, the other if the holes were disaligned. Also many times devices which have dowel members being assembled or reassembled will have their dowel holes slightly disaligned. Thereafter much effort was necessary to align the dowel holes.

It is the object of the present invention to overcome the disadvantages of the prior art by providing an adjustable dowel which can be used to dowel members whether or not the holes therein are aligned.

In accordance with the present invention an adjustable dowel is provided comprising a first member having a bore therethrough. A second member in juxtaposition with first member and having a bore therethrough in alignment with the bore of said first member. A pin having a tapered section. A pair of split bushings having tapered eccentric holes therein disposed on said pin in alignment with each other and said pin disposed through said bores of said first and second members. Means are operatively connected to the end of said pin to force said pin to expand said pair of split bushings into operative engagement with the bores of said first and second members whereby said first and second members are doweled to each other.

One of the objects of this invention is to provide a simple and efficient adjustable dowel which will allow for greater flexibility in joining two members.

Other advantages and objects as may appear from the accompanying specification in addition to the ones above recited consist of various features of construction and combination of parts which will first be described in connection with the accompanying drawings showing an adjustable dowel of a preferred form and the features forming the invention will be specifically pointed out in the claims.

Figure 1:
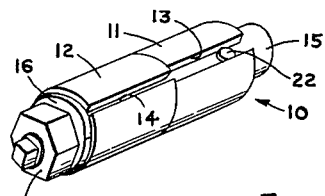
FIGURE 1 is a perspective view of the dowel pin assembly showing the bushings in alignment to each other.

Referring more particularly to the drawings, FIGURE 1 shows the novel dowel pin assembly 10 in which a pair of bushings 11 and 12 having splits 13 and 14 respectively are disposed on a pin 15. The pin 15 receives a lock washer 16 and nut 17 which is tightened to maintain the assembled position as more fully described hereinafter.

Figure 2:
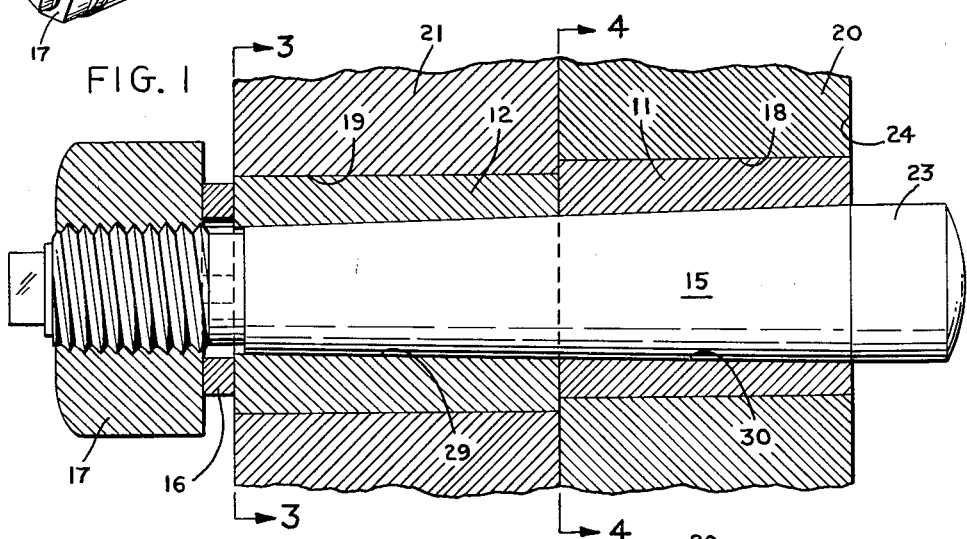
FIGURE 2 is a vertical section through the dowel pin when assembled in the holes in the bores of the first and second members.

Whether bores 18 and 19 of members 20 and 21, respectively, are aligned or not the novel adjustable dowel can be used with equal effectiveness. FIGURE 2 shows members 20 and 21 with the bores 18 and 19 in slight disalignment but it is understood that if they were in alignment the split bushings 11 and 13 would appear as in FIGURE 1 in alignment.

Accordingly, pin 15 has a peg 22 which is engaged in the split 13 to prevent bushing 11 from turning upon the pin 15. Section 23 is adjacent the peg 22 and extends past the edge 24 of member 20, but it is understood that in some applications, for example, foundations, the pin 15 can be made with section 23 substantially smooth with edge 24. Intermediately the pin 15 has a tapered section 25. At the other end the pin 15 has a tip 26 adapted to receive a wrench. This tip 26 can be made any convenient shape such as square. There is a threaded section 27 adjacent to the tip 26 which threadedly receives nut 17 thereon, as illustrated in FIGURE 2.

Figures 3, 4:
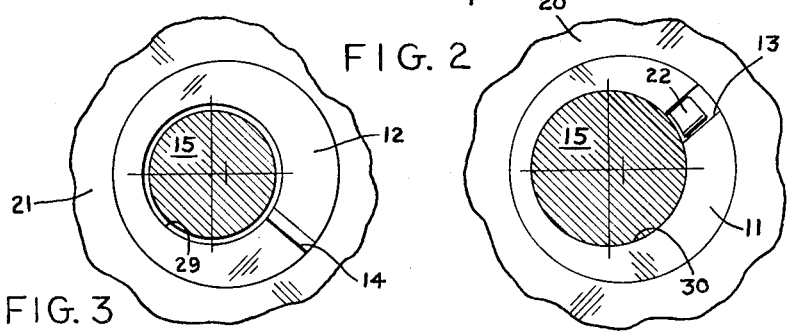
FIGURE 3 is a cross-section taken on line 3—3 of FIGURE 2.
FIGURE 4 is a cross-section taken on line 4—4 of FIGURE 2.

The bushings 11 and 12 as illustrated in FIGURE 1 are of equal outer diameter but it is understood that in certain applications it would be more convenient to have these diameters of unequal dimensions. The bushings 11 and 12 have eccentric holes 29 and 30, respectively, therein, which holes are tapered corresponding to the tapered section 25 of the pin 15. For convenience the splits 13 and 14 of bushings 11 and 12 are shown in alignment with each other in FIGURE 1. However, this is merely a matter of choice. Any desired orientation can be attained. As illustrated in FIGURES 3 and 4 the bushings can be rotatably disposed in the bores 18 and 19, which is evidenced by the position of the splits 13 and 14.

Operation

Figure 5:
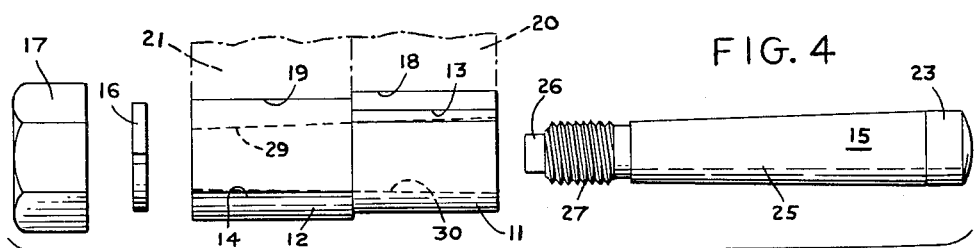
FIGURE 5 is a partially exploded view of the dowel pin assembly shown in FIGURE 2.

Members 20 and 21 are placed in juxtaposition and whether the bores 18 and 19 are in alignment, or as shown in FIGURE 2 slightly disaligned, the adjustable dowel assembly procedure is as follows:

Bushing 11 is disposed on pin 15 with peg 22 in the split 13. Thereafter as shown in FIGURE 5 the pin 15 is disposed through bores 18 and 19. The pin 15 and bushing 11 are rotated so as to substantially dispose the pin 15 in the center of bore 19. Bushing 12 is disposed into bore 19. By rotatably adjusting the pin 15 and bushing 11 until the axis of the pin 15 is aligned with the eccentric axis of hole 30 of bushing 12, this bushing can now be disposed into the bore 19. It is understood that the only limitation on the disalignment of bores 18 and 19 is that of the amount of the eccentricity of holes 29 and 30. On bushings 11 and 12 being rotated in the bores 18 and 19, respectively, it is possible to align their eccentric axes regardless of the positioning of the disalignment in bores 18 and 19.

The lock washer 16 is placed on pin 15 and the nut 17 is threadably received on the threaded section 27 of the pin 15. To facilitate tightening pin 15 the tip 26 thereof is adapted to receive a wrench (not shown) so that two wrenches may be used, one on tip 26 and the other on the nut 17 to tighten the nut.

The effect of the tightening of the nut 17 on the pin 15 is to force the tapered section 25 of the pin 15 in the direction of the nut 17 thus forcing the bushings 11 and 12 to expand into engagement with the bores 18 and 19, respectively, to form the assembled dowel position of members 20 and 21.

It will be understood that this invention is not limited to the specific construction or arrangement of parts shown but that they may be widely modified within the invention defined by the claims.

What is claimed is:
1. An adjustable dowel for connecting two adjacent members comprising:
(a) each member having a bore therein in adjacent relationship to each other,
(b) a first split bushing disposed in one bore,
(c) a second split bushing disposed in the other bore,

(d) each of said bushings having a tapered eccentric hole therethrough,
(e) a pin having a tapered section thereon adapted to be engaged in the tapered holes of the bushings,
(f) the pin in operative association with each of said bushings and adapted to extend through the eccentric holes thereof on said holes being aligned by rotation of said bushings,
(g) locking means operatively associated with the pin to force said pin to expand said split bushings into operative engagement in the bores of said members whereby said members are doweled to each other.

2. The combination claimed in claim 1 wherein said pin extending through the bores in said members is in eccentric relationship to the axes thereof.

3. The combination claimed in claim 2 wherein peg means on said pin prevents said pin from rotating relative to one of the bushings whereby said pin can be rotated with said bushing for alignment with the other bushing which can also be rotated independently for alignment therewith.

4. The combination claimed in claim 3 wherein:
(a) said locking means includes a nut member,
(b) said pin having a threaded section near the end thereof adjacent the smaller diameter of the tapered section thereof,
(c) said nut threadedly disposed on said threaded section of the pin to force the tapered section thereof to expand the split bushings into operative engagement in the bores of the members whereby said members will be doweled to each other.

5. The combination claimed in claim 1 wherein:
(a) the bore of one member is in slight axial disalignment with the bore of the other member,
(b) each of said bushings to be independently rotated in the bores of the members to align the eccentric holes therein with each other to permit said pin to extend therethrough.

References Cited in the file of this patent

UNITED STATES PATENTS

| | | |
|---|---|---|
| 2,213,919 | Michon | Sept. 3, 1940 |
| 2,901,787 | Whistler et al. | Sept. 1, 1959 |
| 3,048,904 | Kloster | Aug. 14, 1962 |